(12) United States Patent
Staas et al.

(10) Patent No.: US 6,975,419 B2
(45) Date of Patent: *Dec. 13, 2005

(54) SYSTEM AND METHOD FOR MOBILE PRINTING

(75) Inventors: David Staas, Camas, WA (US); Jeff M. Anderson, Camas, WA (US); Sherri L. Brown, Clackamas, OR (US); Jeremy Bunn, Kelso, WA (US); David M. Hall, Camas, WA (US); David J Miller, Camas, WA (US); Karen E. Misustin, West Linn, OR (US); Lainye Reich, Vancouver, WA (US); Daniel Revel, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 953 days.

This patent is subject to a terminal disclaimer.

(21) Appl. No.: 09/884,594

(22) Filed: Jun. 18, 2001

(65) Prior Publication Data

US 2002/0191210 A1 Dec. 19, 2002

(51) Int. Cl.[7] .......................................... G06H 15/00
(52) U.S. Cl. ..................................... 358/1.15; 358/402
(58) Field of Search ............................. 358/1.1, 1.12, 358/1.13, 1.14, 1.15, 401, 402, 405, 407, 358/434, 436, 438, 439, 440

(56) References Cited

U.S. PATENT DOCUMENTS

| | | | |
|---|---|---|---|
| 5,283,887 A | 2/1994 | Zachery | 395/500 |
| 5,406,557 A | 4/1995 | Baudoin | 370/61 |
| 5,418,908 A | 5/1995 | Keller et al. | 395/200 |
| 5,436,960 A | 7/1995 | Campana, Jr. et al. | 379/58 |
| 5,781,901 A | 7/1998 | Kuzma | 707/10 |
| 5,838,252 A | 11/1998 | Kikinis | 340/825.44 |
| 5,844,969 A | 12/1998 | Goldman et al. | 379/93.24 |
| 5,903,723 A | 5/1999 | Beck et al. | 395/200.3 |
| 5,905,777 A | 5/1999 | Foladare et al. | 379/90.01 |
| 5,937,162 A | 8/1999 | Funk et al. | 395/200.36 |
| 5,958,006 A | 9/1999 | Eggleston et al. | 709/219 |
| 5,964,833 A | 10/1999 | Kikinis | 709/206 |
| 5,974,449 A | 10/1999 | Chang et al. | 709/206 |
| 5,978,837 A | 11/1999 | Foladare et al. | 709/207 |
| 5,995,597 A | 11/1999 | Woltz et al. | 379/93.24 |
| 6,023,700 A | 2/2000 | Owens et al. | 707/10 |
| 6,035,104 A | 3/2000 | Zahariev | 395/200.33 |
| 6,073,165 A | 6/2000 | Narasimhan et al. | 709/206 |
| 6,160,631 A | 12/2000 | Okimoto et al. | 358/1.15 |

(Continued)

FOREIGN PATENT DOCUMENTS

EP 0772327 A2 5/1997

(Continued)

OTHER PUBLICATIONS

PCT Application, WO 01/22259; Sinia Corporation; "Transferring E-mail Attachments to Devices for Rendering"; Mar. 29, 2001.

(Continued)

Primary Examiner—Arthur G. Evans

(57) ABSTRACT

A printing system and method are provided that facilitate the mobile printing of a document. The printing system comprises an automated print agent located in a device coupled to a network. The printing system also comprises a network alias associated with a printer coupled to the network, where the automated print agent acting as a network destination for a transmitted document addressed to the network alias. The automated print agent orchestrates the printing of the transmitted document on the printer upon receipt of the transmitted document from a transmitting device.

47 Claims, 9 Drawing Sheets

U.S. PATENT DOCUMENTS

| | | | |
|---|---|---|---|
| 6,182,059 B1 | 1/2001 | Angotti et al. | 706/45 |
| 6,219,694 B1 | 4/2001 | Lazaridis et al. | 709/206 |
| 6,256,666 B1 | 7/2001 | Singhal | 709/217 |
| 6,275,848 B1 | 8/2001 | Arnold | 709/206 |
| 6,360,252 B1 | 3/2002 | Rudy et al. | 709/206 |
| 6,522,421 B2 * | 2/2003 | Chapman et al. | 358/1.15 |

FOREIGN PATENT DOCUMENTS

| | | |
|---|---|---|
| EP | 0855821 A1 | 7/1998 |
| EP | 0864964 A2 | 9/1998 |
| EP | 0872792 A2 | 10/1998 |
| EP | 0898410 A2 | 2/1999 |
| EP | 0950969 A2 | 10/1999 |
| EP | 0965908 A2 | 12/1999 |
| EP | 1089543 A1 | 4/2001 |

OTHER PUBLICATIONS

Jeff M. Anderson et al., United States Patent Application entitled "System and Method for Mobile Printing," U.S. Appl. No. 09/974,390; filed on Oct. 10, 2001 (Related Application).

Jeff M. Anderson et al., United States Patent Application entitled "System and Method for Remote Document Retrieval," U.S. Appl. No. 09/884,600; filed on Jun. 18, 2001 (Related Application).

Lainye Reich et al., United States Patent Application entitled "System and Method for Automated Rendering to Print to a File," U.S. Appl. No. 09/884,249; filed on Jun. 18, 2001 (Related Application).

David J. Miller et al., United States Patent Application entitled "System and Method for Configuring a Printing System," U.S. Appl. No. 09/884,598; filed on Jun. 18, 2001 (Related Application).

Jeff M. Anderson et al., United States Patent Application entitled "Rendering Broker Service and Method," U.S. Appl. No. 09/884,593; filed on Jun. 18, 2001 (Related Application).

Jeff M. Anderson et al., United States Patent Application entitled "System and Method for Walk-Up Printing," U.S. Appl. No. 09/884,318; filed on Jun. 18, 2001 (Related Application).

Dana E. Laursen et al., United States Patent Application entitled "Document Delivery System for Automatically Printing a Document on a Printing Device," U.S. Appl. No. 09/855,230; filed on May 14, 2001 (Related Application).

Keith M. Taylor et al., United States Patent Application entitled "Limited Printing of Electronically Transmitted Information," U.S. Appl. No. 09/546,059; filed on Apr. 10, 2000 (Related Application).

Pieter J. van Zee et al., United States Patent Application entitled "Validation and Audit of E-Media Delivery," U.S. Appl. No. 09/694,542; filed on Oct. 23, 2000 (Related Application).

Jon A. Brewster et al., United States Patent Application entitled "Document Delivery System for Automatically Printing a Document on a Printing Device," U.S. Appl. No. 09/325,040; filed on Jun. 7, 1999 (Related Application).

Aloke Gupta et al., United States Patent Application entitled "Document Delivery System for Automatically Printing a Document on a Printing Device," U.S. Appl. No. 09/495,013; filed on Jan. 31, 2000 (Related Application).

Hewlett-Packard Company patent application. U.S. Appl. No. 09/745,711, filed on Dec. 18, 2000. System And Method For Printing A Document For A Network User.

Hewlett-Packard Company patent application. U.S. Appl. No. 09/697,990, filed on Oct. 27, 2000. Method And System For Printing From An IP Network.

Hewlett-Packard Company patent application. U.S. Appl. No. 09/662,372, filed on Sep. 13, 2000. Method And Apparatus For Printing Via A Wireless Communication Device.

Hewlett-Packard Company patent application. U.S. Appl. No. 09/814,284, filed on Mar. 21, 2001. Mailbox Printing Services For Information Appliances.

Hewlett-Packard Company patent application. U.S. Appl. No. 09/799,381, filed on Mar. 6, 2001. System And Method For Distributed Processing.

Hewlett-Packard Company patent application. U.S. Appl. No. 09/804,607, filed on Mar. 12, 2001. Mobile Remote Printing Systems.

Hewlett-Packard Company patent application. U.S. Appl. No. 09/712,337, filed on Nov. 13, 2000. System And Method For Printing To A Printer Without The Use Of A Print Driver.

* cited by examiner

SYSTEM AND METHOD FOR MOBILE PRINTING

TECHNICAL FIELD

The present invention is generally related to the field of printing and, more particularly, is related to a system and method for mobile printing.

BACKGROUND OF THE INVENTION

Recent years have seen a proliferation of portable electronic devices such as personal digital assistants (PDA's), cellular telephones, and/or other portable electronic devices. For example, personal digital assistants are now available such as the HP Jornada manufactured by Hewlett-Packard Company based in Palo Alto, Calif., or the Blackberry™ manufactured by Research in Motion™ Limited based in Ontario, Canada as well as other brands. These mobile devices offer a range of capabilities, including mobile calendars, organizing capabilities, and electronic mail (email) received and transmitted via a mobile pager network or other mobile networks, etc.

Unfortunately, these devices are typically limited in their capabilities due to the fact that they are limited in their processing capacity and memory size. For example, many such devices cannot execute the many different applications that are available for the average personal computer. Specifically, such devices may not be able to implement word processors or other extensive applications.

When it comes to activities such as printing, etc., such devices typically are unable to perform various tasks such as rendering documents into printer compatible form, etc. This fact can negatively impact the usefulness of such devices. For example, a user may find themselves in the situation where they are standing in front of a printer with their personal digital assistant in hand and a document stored thereon that they wish to print. Unfortunately, in such a circumstance, the user may be prevented from printing a document on the printer due to the limited capability of the personal digital assistant and the lack of connectivity between the printer and the personal digital assistant.

In another situation, a user may find themselves visiting customers outside of their normal office where their own personal computer or company network reside. At such time, there may be a document that the user wishes to print out for his or her customers that is stored in a server or on the personal computer back at their office. Today's personal digital assistants lack the capability to interact with the network back at the office in order to obtain the document in electronic form. Also, assuming the user obtains the document, they are still faced with the difficulty of printing it out.

In yet another situation, a user may have a laptop computer that has the computing capacity to perform the tasks necessary to print a document. However, the user may be in a location where they do not have access to their usual printer. In such a case, the user may be prevented from printing to any available printer because it is a different model that requires a rendering service or printer specific driver that is not stored on their laptop.

SUMMARY OF THE INVENTION

In view of the foregoing, the present invention provides for a printing system and method to facilitate the mobile printing of a document. In one embodiment, the printing system comprises an automated print agent located in a device coupled to a network. The printing system also comprises a network alias associated with a printer coupled to the network, where the automated print agent acts as a network destination for a transmitted document that is addressed to the network alias. The automated print agent orchestrates the printing of the transmitted document on the printer upon receipt of the transmitted document from a transmitting device.

The present invention also provides for a printing method that enables mobile printing. In this respect, the method includes the steps of associating a network alias with a printer coupled to a network, designating an automated print agent in a device coupled to a network as a network destination for a transmitted document addressed to the network alias, and, orchestrating a printing of the transmitted document on the printer with the automated print agent upon receipt of the transmitted document by the automated print agent that is addressed to the network alias.

In another embodiment, the present invention provides for a system to facilitate email printing. In this regard, the system includes a processor circuit having a processor and a memory. Stored on the memory and executable by the processor is an automated print agent. The automated print agent includes logic that converts an email received by the automated print agent into a document for printing, the email being addressed with a destination address that is associated with a printer, and, logic that applies the document to the printer associated with the destination address of the email for printing.

In still another embodiment, the present invention provides for a method to facilitate email printing. In this regard, the method comprises the steps of converting an email received by the automated print agent into a document for printing, the email being addressed with a destination address that is associated with a printer, and, applying the document to the printer associated with the destination address of the email for printing.

The present invention also provides for a program stored on a computer readable medium to facilitate email printing. In this regard, the program comprises code that converts an email received by the automated print agent into a document for printing, the email being addressed with a destination address that is associated with a printer, and, code that applies the document to the printer associated with the destination address of the email for printing.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
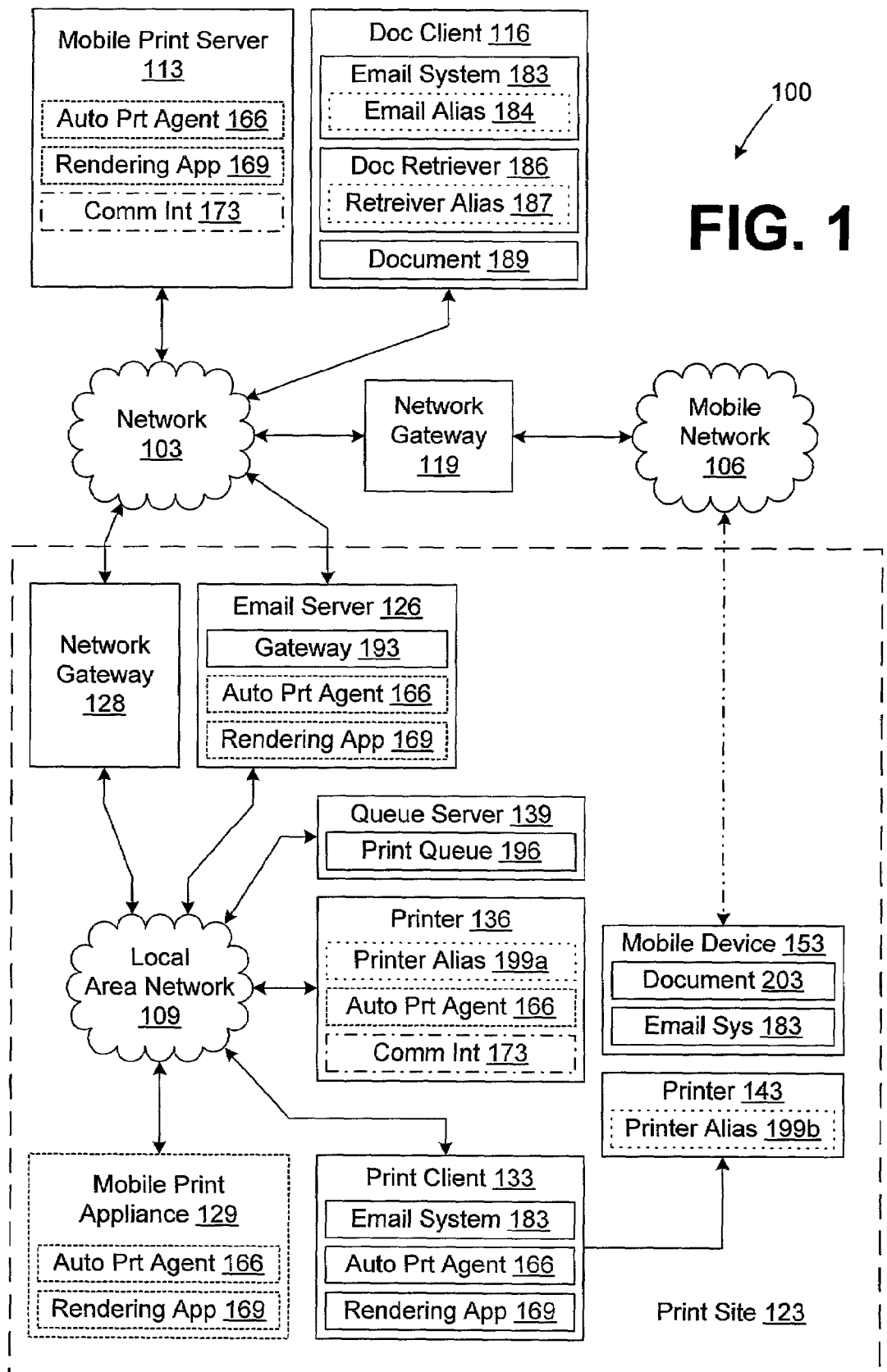
FIG. 1 depicts a block diagram that depicts a mobile print network according to an aspect of the present invention.

With reference to FIG. 1, shown is a mobile print network 100 according to the present invention. The mobile print network 100 includes several components that interact with each other in various ways to accomplish the remote printing of a document as will be discussed. In the following discussion, first the physical make-up of the mobile print network 100 is provided followed by a description of the operation of the mobile print network 100. Thereafter, various components of the mobile print network 100 are described in greater detail with reference to figures that follow.

To begin, the mobile print network 100 includes a network 103, a mobile network 106, and a local area network 109. The network 103 may be, for example, the Internet, a wide area network, or other network, or a combination of such networks. The mobile network 106 may comprise, for example, a pager network or cellular network that accommodates wireless transmission to mobile devices as is generally known by those with ordinary skill in the art. The local area network 109 may comprise one of several technologies including, for example, a peer-to-peer architecture, a ring network, a star network, a token bus network, token passing technology, or token rings networks or other configurations.

Coupled to the network 103 are a mobile print server 113 and a document client 116. The mobile print server 113 and the document client 116 may comprise, for example, a computer system or other such system as is generally known by those with ordinary skill in the art. The network 103 and the mobile network 106 are coupled, for example, through a network gateway 119 that bridges data communication between the network 103 and the mobile network 106 as is generally known by those with ordinary skill in the art.

The mobile print network 100 also includes a print site 123 that may be, for example, a particular company, institution, or other entity that employs the local area network 109. For purposes of facilitating the discussion herein, the print site 123 is identified because one or more printers are located therein that a user may wish to use to print a particular document as will be discussed. In this respect, located at the print site 123 is an email server 126, a network gateway 128, a mobile print appliance 129, a print client 133, and a printer 136 all of which are coupled to the local area network 109. Since the printer 136 is a network printer, therefore, a queue server 139 is also included to control the flow of print jobs to the printer 136. Alternatively, a peer-to-peer approach may be employed to cause printing jobs to be sent to the printer 136. In such a case, the queue server 139 may not be necessary as is generally known by those with ordinary skill in the art. Attached to the print client 133 is a local printer 143. Also, the mobile print network 100 includes a mobile device 153 that is in wireless communication with the mobile network 106. The mobile device 153 may be, for example, the HP Jornada manufactured by Hewlett-Packard Company based in Palo Alto, Calif., or the Blackberry™ manufactured by Research in Motion™ Limited based in Ontario, Canada as well as other devices.

The network gateway 128 may be employed to effect data communication between devices coupled to the local area network 109 and devices coupled to the networks 103 and 106. In this respect, the network gateway 128 may employ the Transmission Control Protocol/Internet Protocol (TCP/IP), Hypertext Transfer Protocol (HTTP), or other suitable technologies as is generally known by those with ordinary skill in the art.

Many of the various devices that make up the mobile print network 100 include various components and/or systems that may be implemented in terms of software, hardware, or a combination of software and hardware. Also, many of these components may be located in different ones of the devices in the mobile print network 100, thereby providing significant flexibility in the installation and operation as will be discussed. For instance, the mobile print server 113 may include an automated print agent 166, a rendering application 169 and a communications interface 173. In this respect, the mobile print server 113 may comprise, for example, a computer system or other like device. Note, however, that the automated print agent 166 and the rendering application 169 may or may not reside on the mobile print server 113 as will be discussed.

The document client 116 includes an email system 183 with an associated email alias 184 that acts as the destination address of the email system 183 on the network 103. The document client 116 also includes a document retriever 186 that also may include a retriever alias 187 that similarly acts as the destination address of the email system 183 on the network 103. One or more documents 189 or other files are stored on the document client 116. The document client 116 may also comprise a computer system or other like device.

The email server 126 includes a gateway 193 that routes email messages to the various devices on the local area network 109. The email server 126 may also include the automated print agent 166 and the rendering application 169. In a similar manner the automated print agent 166 may be located on the mobile print appliance 129, the printer 136, or the print client 133. Likewise, the rendering application 169 may be located in the mobile print appliance 129 or the print client 133 as shown. A print queue 196 is located on the queue server 139. In various embodiments, the communications interface 173 is located on the printer 136 and on the mobile print server 113. An electronic mail (email) system 183 is located on both the print client 133 and the mobile device 153. As contemplated herein, email refers to data information exchange using the Simple Mail Transfer Protocol (SMTP) or like protocol.

Associated with each of the printers 136 and 143 are printer aliases 199a and 199b, respectively. Each of the printer aliases 199a and 199b is a unique address on the networks 103, 106, and 109 that identifies the respective printers 136 and 143. In this regard, the aliases 199a and 199b may be, for example, email addresses, or addresses employed with some other information transport system employed on the networks 103, 106, and 109. Finally, the mobile device 153 includes a document or multiple documents 203 that are stored thereon. Note that in associating each of the printer aliases 199a and 199b with the printers 136 and 143, respectively, the printer aliases 199a are not necessarily maintained within the printers 136 and 143.

Specifically, the printer aliases 199*a* and 199*b*, may be stored in the email server 126, the automated print agent 166, or other system or device, etc., as can be appreciated by one with ordinary skill in the art.

Next a general explanation of the operation of the mobile print network 100 is provided in the context of several scenarios in which the mobile print network 100 is employed to print a document and perform other tasks as desired by a particular user. In a first scenario, assume that a user who carries the mobile device 153 is visiting the print site 123 that happens to be one of the user's customers, etc. Also assume, for example, that the user is embroiled in negotiations to accomplish some business task as is typical. Stored on the mobile device 153 is a document 203 that the user wishes to print out to provide copies to the customer during the course of the negotiations or other transaction.

At the print site 123, the user may have several choices of printers, including printers 136 and 143 and other printers linked to the local area network 109, that they may use to print the document 203. Assume that the user chooses to print the document 203 on the printer 136 that is coupled directly to the local area network 109. According to an aspect of the present invention, the user may walk up to the printer 136 and identify the particular printer alias 199*a* that is assigned thereto. According to one aspect of the present invention, the printer alias 199*a* is printed in a label form that is attached to the printer 136, thereby associating the alias with the printer 136.

Alternatively, the printer 136 and the mobile device 153 may each include an infrared (IR) port with the capability of communicating via an IR signal protocol as are generally known by those skilled in the art. Provided both the printer 136 and the mobile device 153 have such capability, then a communications protocol may be implemented between both devices to communicate the printer alias 199*a* from the printer 136 to the mobile device 153 via an IR link.

Once the user knows the printer alias 199*a* associated with the printer 136, the user then creates an email message with the email system 183 in the mobile device 153 and attaches the document 203 to be printed to the email message. The user then enters the printer alias 199*a* as the destination address for the email message and then transmits the email message to the printer 136. The email message with the attached document 203 then is transmitted from the mobile device 153 in a wireless connection to the mobile network 106. Upon detecting the destination address of the email message, the mobile network 106 then provides the email message to the network 103 through the network gateway 119. The network 103 then routes the same email message to the email server 126, and the gateway 193 in the email server 126 routes the email message to the automated print agent 166 through the local area network 109.

Note that the automated print agent 166 may reside in any one of the mobile print appliance 129, the email server 126, the printer 136, the network gateway 128, the printer 136, or other devices that are in data communication with the mobile device 153. Alternatively, the gateway 193 may temporarily store the email message and will transmit the same to the automated print agent 166, wherever it is located, when polled by the automated print agent 166 in a "pull" relationship as is generally known by those with ordinary skill in the art. Alternatively, the printer alias 199*a* may route the email message to the automated print agent 166 that is located on the mobile print server 113. Regardless of where the automated print agent 166 is located, in all cases it acts as a network destination for the email message with the attached document 209 that was addressed to the printer alias 199*a*.

Upon receiving the email message with the attached document 203, the automated print agent 166 orchestrates the printing of the document 203 on the printer 136. In doing so, the automated print agent 166 transmits the document 203 to the rendering application 169, wherever it is located, in order to have the document 203 rendered in a printer ready format. The rendering application 169 may be located in the email server 126, the mobile print appliance 129, the mobile print server 113, or the network gateway 128 as shown as well as other devices that are in data communication with the automated print agent 166. The printer ready format may be, for example, printer control language (PCL) or PostScript, such printer ready formats being generally known by those with ordinary skill in the art.

When the document 203 is rendered in the appropriate printer control language by the rendering application 169, it transmits the rendered document back to the automated print agent 166. All communication between the automated print agent 166 and the rendering application 169 may be accomplished using a transport mechanism such as email, hypertext transfer protocol (HTTP), or other communications protocol, etc., between the rendering application 169 and the automated print agent 166. When the automated print agent 166 receives the rendered document 203 back from the rendering application 169, the automated print agent 166 then applies the document to the print queue 196 in the queue server 139 that ultimately causes the document 203 to be printed on the printer 136. In those cases in which a queue server 139 is not used, the document 203 is sent directly to the printer 136 as can be appreciated by one with ordinary skill in the art. The fact that the automated print agent 166 and the rendering application 169 can be located in the various different devices in the mobile print network 100 provides flexibility in the manner in which a mobile print capability can be implemented as can be appreciated by one with ordinary skill in the art.

In another scenario, a user of the mobile device 153 wishes to print the document 203 on the printer 143 that is locally attached to the print client 133 that may be, for example, a computer system or other like device, etc. Note that the print client 133 may also be coupled to the network 103 or to some other network other than the local area network 109 as can be appreciated by those with ordinary skill in the art. Assuming the user wishes to print to the printer 143, the user creates an email message that is addressed using the printer alias 199*b* and attaches one or more documents 203 thereto to be printed. The user then transmits the email message with the attached documents 203 to the email server 126. The gateway 193 then routes the email message to the print client 133 that is ultimately received by the automated print agent 166. Alternatively, the email message may be received by the email system 183 that interfaces with the automated print agent 166 and forwards all such email messages to the automated print agent 166.

Ultimately, the automated print agent 166 receives the email message with the attached documents 203 and orchestrates the printing of the documents 203. Specifically, the automated print agent 166 detaches the documents 203 from the email message and applies them to the rendering application 169 on the print client 133 for rendering into the printer control language that is associated with the printer 143. Once the documents 203 are rendered in the printer control language, then the automated print agent 166 applies the documents 203 to the printer 143. In addition, note that the automated print agent 166 and the rendering application 169 may reside in devices other than the print client 133. However, in such case, a proper interface should be located in the print client 133 to interface with the automated print agent 166 and to hand off all print jobs received from the automated print agent 166 to the printer 143.

In another scenario, the document retrieval features of the mobile print network 100 are described. Assume that a user of the mobile device 153 finds themselves at the print site 123 without the document 189 that they wanted to print for a particular customer. Specifically, the document 189 is stored on the print client 116 that may be, for example, the user's computer system or like device located back at their office, etc. Since the document 189 is remotely stored in the document client 116, the user does not have access to the document 189 in order to print it at the print site 123. However, the present invention provides the user of the mobile device 153 with remote access to the document 189 that is stored on the document client 116. Specifically, the user remotely accesses the document 189 by generating a request for the document in the form of an email message using the email system 183 on the mobile device 153 that is transmitted to the document client 116.

Thus, the email message is a "request" email message that embodies a document request for the document 189 stored on the document client 116. The request email message conforms to a predefined format that is understood by the document retriever 186. In this respect, a user interface may be employed in the mobile device 153 to generate the request to ensure that the request email message is generated in the proper format. The destination address included in the request email message may be the email alias 184 or the retriever alias 187 that directs the email message to either the email system 183 or the document retriever 186, respectively. Ultimately, the request email message is to be sent to the document retriever 186. If it is sent to the email system 183, then the document retriever 186 is appropriately configured to interface with the email system 183 to obtain the request email message therefrom.

When the document retriever 186 ultimately receives the request email message from the mobile device 153, it generates a reply email message in response thereto. The document retriever 186 attaches the requested document 189 to the reply email message and then automatically transmits the reply email message with the attached document 189 back to the mobile device 153. In this manner, the user of the mobile device 153 may obtain the document 189 from the document client 116 using the email system 183 as a transport mechanism. Alternatively, a data communications protocol other than the email system 183 may be employed as the transport mechanism. However, use of an email system as a transport mechanism provides a distinct advantage in that existing email infrastructure may be employed.

Note that the request email message would include the directory location and file name of the document 189 that is to be retrieved by the document retriever 186. This information is embodied in the request email message according to a predetermined format. However, in those circumstances where the user of a mobile device 153 cannot remember the directory and/or the file name of the document 189, the user may transmit a directory request email message to the document retriever 186. In response, the document retriever 186 generates a directory reply email message that includes a directory file listing of the files stored within the document client 116. The directory file listing is transmitted back to the mobile device 153 in a directory response email message to provide the user with a detailed list of the file names of all the documents 189 stored in the document client 116 and the directory under which each of the documents 189 is stored.

In addition, if the user of the mobile device 153 wishes to print the document 189 retrieved from the document client 116 on the printer 136, then the user may specify a destination address for the document 189 in the request email message transmitted to the document retriever 186. Specifically, in order to print the document 189 on the printer 136, the user would include the printer alias 199a in the request email message as the destination address for the document 189. Upon receiving such a request email message, the document retriever 186 then generates the reply email message addressed to the printer alias 199a with the document 189 attached thereto. The reply email message is then transmitted to the corresponding automated print agent 166 designated to receive the emails addressed to the printer alias 186 wherever it resides in the local area network 109 to print the document 189 on the printer 136 as was described previously.

Figure 2:
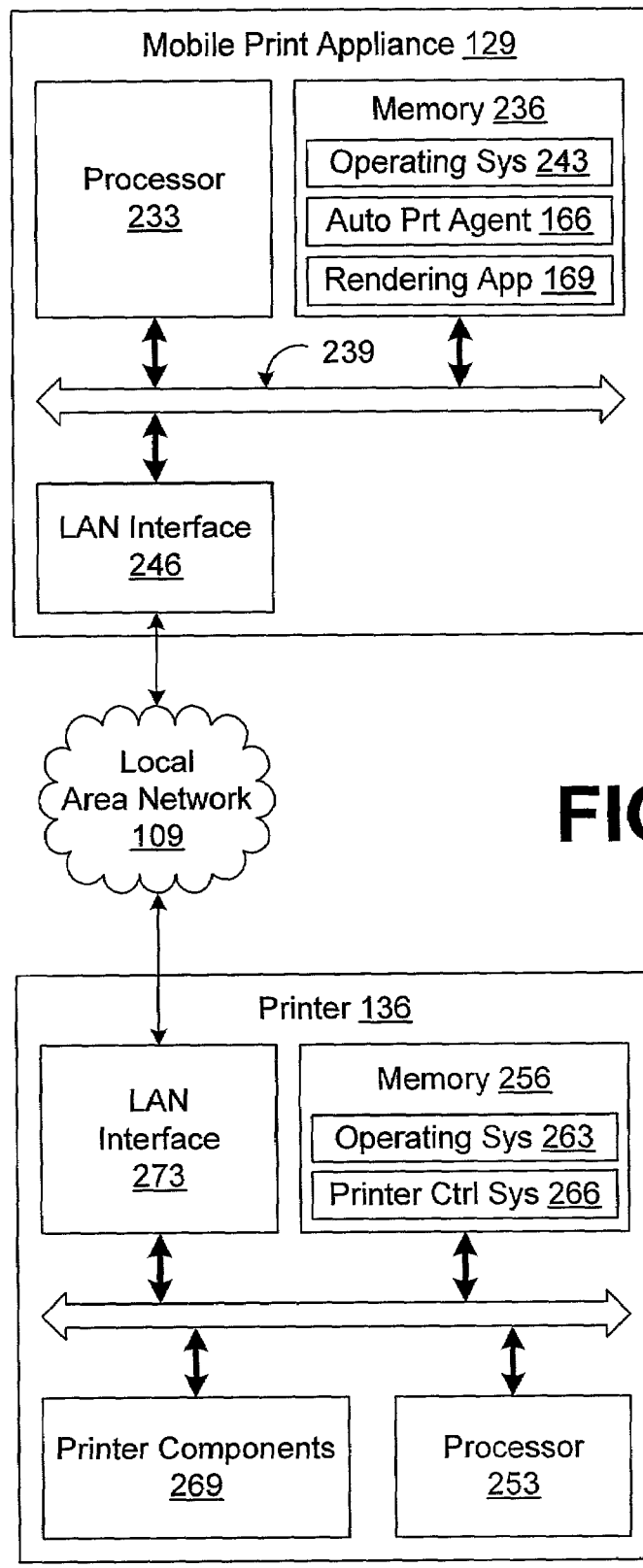
FIG. 2 depicts a block diagram of a first mobile print configuration according to an aspect of the present invention.

With reference to FIG. 2, shown is a block diagram of the mobile print appliance 129 that is coupled to the printer 136 through the local area network 109 to provide a further illustration of one of the scenarios described above. As shown, the mobile print appliance 129 includes a processor 233 and a memory 236, both of which are coupled to a local interface 239. The local interface 239 may be, for example, a data bus with an accompanying control/address bus as is understood by those with ordinary skill in the art. Stored on the memory 236 and executable by the processor 233 are an operating system 243, the automated print agent 166, and the rendering application 169. The mobile print appliance 129 also includes a local area network interface 246 that links the local interface 239 to the local area network 109. In this respect, the local area network interface 246 may be, for example, a network card or other such device as is generally known by those with ordinary skill in the art.

The printer 136 also includes a processor circuit having a processor 253 and a memory 256, both of which are coupled to a local interface 259. The local interface 259 may be a data bus with an accompanying control/address bus as is generally known by those with ordinary skill in the art. Stored on the memory 256 and executable by the processor 253 are an operating system 263 and a printer control system 266. The printer control system 266 generally provides for the operation of the printer 136 itself as is generally known by those with ordinary skill in the art. In this respect, the printer 136 includes various printer components 269 such as motors and mechanical paper path components as well as image creation components that generally provide for print operation. The printer 136 also includes a local area network interface 273 that couples the local interface 259 to the local area network 109 as shown. In this respect, the local area network interface 273 may be a network card or other such device as is generally known by those with ordinary skill in the art.

FIG. 2 illustrates one embodiment of the mobile print appliance 129 and the printer 136 with respect to the fact that both the mobile print appliance 129 and the printer 136 employ a processor circuit as described that implements the various components stored on the memories 236 and 256. With reference back to FIG. 1, several other components of the mobile print network 100 may also be implemented using a processor circuit in a similar manner with as shown with respect to the mobile print appliance 129 and the printer 136 in FIG. 2. In this respect, the mobile print server 113, document client 116, email server 126, network gateway 128, the print client 133, the queue server 139, the printer 136, the printer 143, and the mobile device 153 may all employ processor circuits in a similar manner to the mobile print appliance 129 and the printer 136 as depicted in FIG. 2. All of these devices may be, for example, a computer system or other system as is generally known by those with ordinary skill in the art. Note that while the mobile device 153 may include a processor circuit, such a circuit may be limited in its processing capacity as compared to the processing capacity of other components in the mobile print network 100.

The mobile print appliance 129, the mobile print server 113, document client 116, email server 126, network gateway 128, the print client 133, the queue server 139, the printer 136, the printer 143, and the mobile device 153 may all include various peripheral devices. In particular, peripheral devices may include, for example, a keypad, touch pad, touch screen, microphone, scanner, mouse, joystick, or one or more push buttons, etc. The peripheral devices may also include display devices, indicator lights, speakers, printers, etc. Specific display devices may be, for example, cathode ray tubes (CRT), liquid crystal display screens, gas plasma-based flat panel displays, or other types of display devices, etc.

In addition, each of the memories 236 and 256 may include both volatile and nonvolatile memory components. Volatile components are those that do not retain data values upon loss of power. Nonvolatile components are those that retain data upon a loss of power. Thus, each of the memories 236 and 256 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other such of memory device.

Also, each of the processors 233 and 253 may represent multiple processors and each of the memories 236 and 256 may represent multiple memories that operate in parallel processing circuits, respectively. In such a case, each of the local interfaces 239 and 259 may be an appropriate network that facilitates communication between any two of the multiple processors, between any processor and any of the memories, or between any two of the memories, etc. The processors 233 and 253 may be electrical or optical in nature.

The operating systems 243 and 263 are executed to control the allocation and usage of hardware resources in the mobile print appliance 129 and the printer 136, respectively. Specifically, the operating systems 243 and 263 control the allocation and usage of the memories 236 and 256, processing time, and the peripheral devices as well as performing other functionality. In this manner, the operating systems 243 and 263 serve as the foundation on which applications depend as is generally known by those with ordinary skill in the art.

Figure 3A:
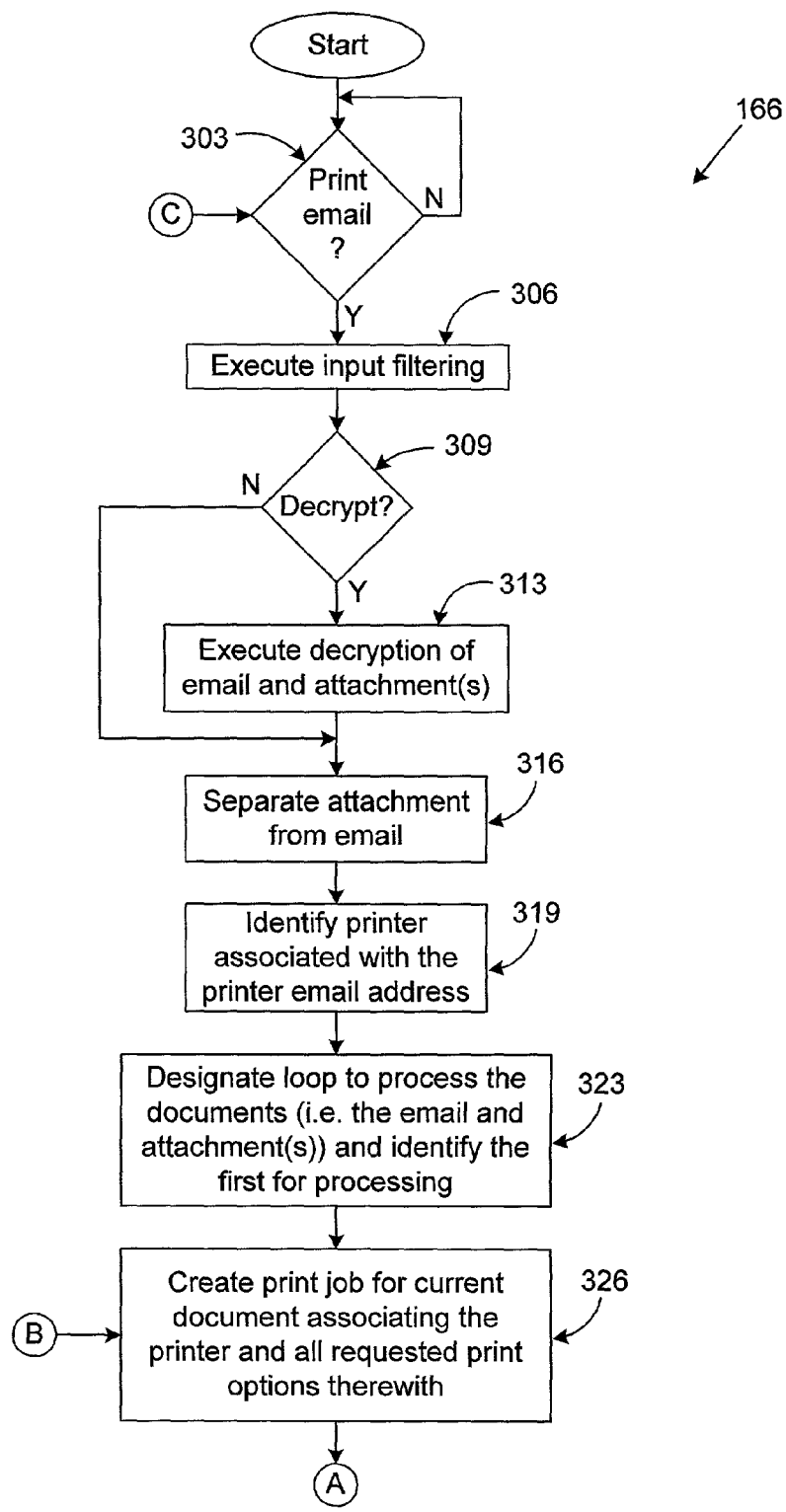
FIGS. 3A and 3B depict flow charts of an automated print agent employed at various points in the mobile print network of FIG. 1.
Figure 3B:
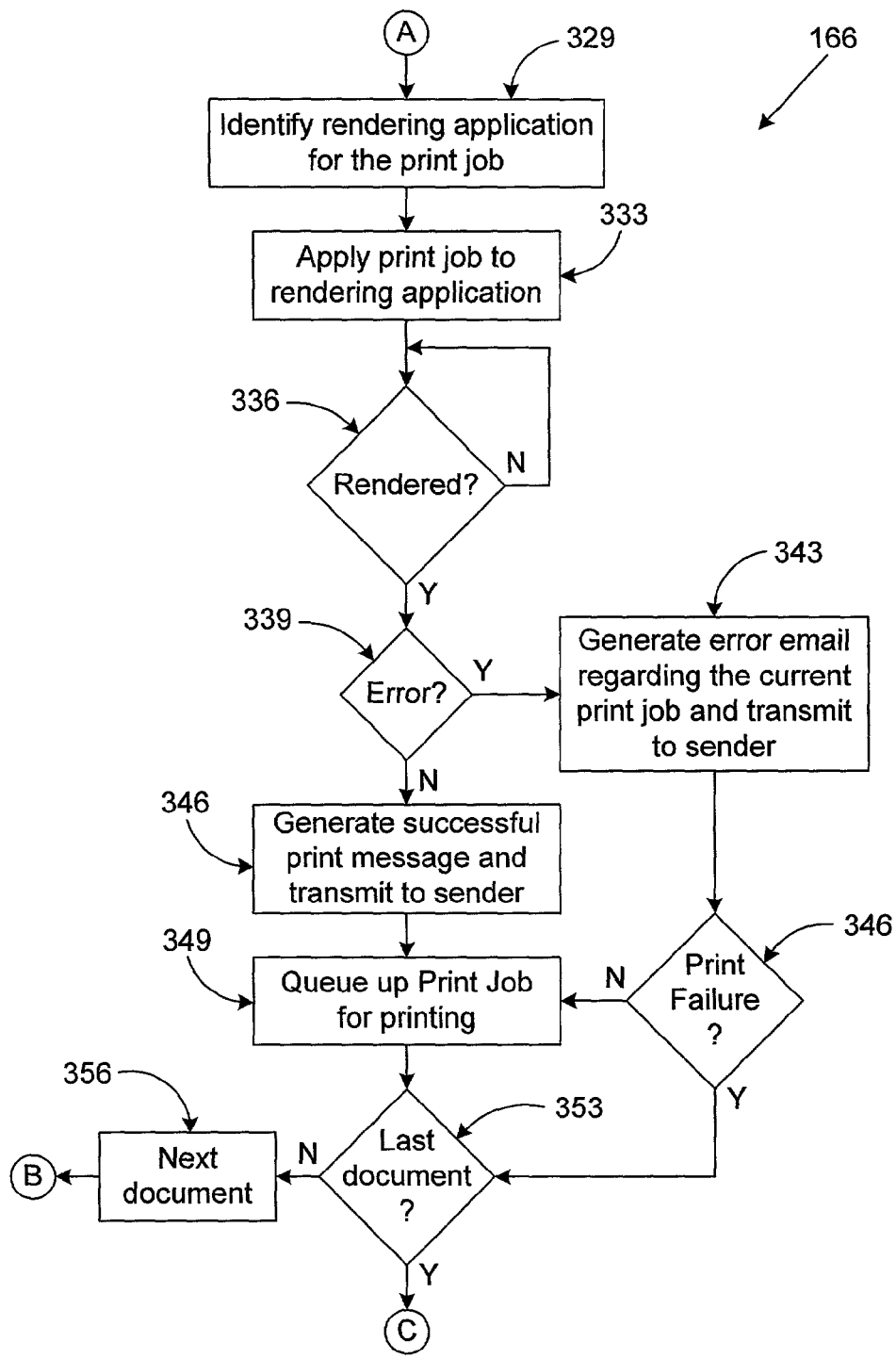

Referring then to FIGS. 3A and 3B, shown is a flow chart of the automated print agent 166 that may reside within the various devices of the mobile print network 100 (FIG. 1) as discussed previously. Alternatively, the flow chart of FIGS. 3A and 3B may be viewed as depicting steps in a corresponding method. As was previously described, the automated print agent 166 is executed in order to orchestrate the printing of a document attached to an email message that was received by the automated print agent 166.

With specific reference to FIG. 3A, beginning with box 303, the automated print agent 166 determines whether an email message with an attached document to be printed has been received. The specific detecting of an email message with an attached document to be printed may be accomplished in several different ways. For example, the automated print agent 166 may be designated as the network destination for a particular printer alias 199a or 199b. In such case, the corresponding email message is applied directly to the automated print agent 166 by the gateway 193 (FIG. 1) in the email server 126 (FIG. 1). The automated print agent 166 may also pull such email messages from the gateway 193 by implementing a "pull" configuration as is generally known by those with ordinary skill in the art.

In another alternative, the automated print agent 166 may interface with an email system 183 (FIG. 1) to obtain the email message that was originally received by the email system 183. However the automated print agent 166 receives the email message with the attached document to be printed, upon receiving such an email message the automated print agent 166 proceeds to box 306 to perform various filtering tasks. The filtering tasks may comprise, for example, a blocking task that restricts access to the corresponding printer to select users in cases where various organizations wish to limit the ability of individuals to print on a particular printer. This may be done, for example, by examining the "from" field in a particular email message to determine if the message was sent by an authorized user. Also, other security access technology may be employed to restrict the access to specific users such as, for example, employing security codes or other such approaches. In addition, the filtering tasks may include scanning for viruses in the attachment and in the email, as well as performing authentication routines to ensure that the user who sent the email message with the attached document is the person that he or she represents himself or herself to be. To accomplish the virus scanning and authentication tasks, various technologies that are generally available on the market may be employed as is generally known by those with ordinary skill in the art.

After the filtering tasks are completed in box 306, the automated print agent 166 proceeds to box 309 to determine whether any decryption is to be performed on the email message with the attached document. If the email message and attachments were encrypted, then the automated print agent 166 proceeds to box 313 to execute an appropriate decryption system as is generally known by those with ordinary skill in the art. Thereafter, the automated print agent 166 proceeds to box 316. Also, if it is discovered that there is no decryption to be performed in box 309, then the automated print agent 166 proceeds to box 316.

In box 316, the automated print agent 166 breaks down the email message by separating the one or more attachments from the email message that was received. Note that this may be accomplished employing various components of the JavaX.mail libraries that are commercially available. The JavaX.mail libraries are created and marketed by Sun MicroSystems, Inc., of Palo Alto, Calif.

Thereafter, the automated print agent 166 proceeds to box 319 in which the printer associated with the destination email address of the email message is identified. Specifically, the destination email address will be one of the printer aliases 199*a* (FIG. 1) or 199*b* (FIG. 1) as discussed previously. An association may be drawn between the printer 136 or 143 and the respective printer alias 199*a* or 199*b* by consulting a predefined lookup table that is stored as a portion of the automated print agent 166. The lookup table may be created by network administrators in setting up the mobile print network 100 as can be appreciated by those with ordinary skill in the art. The automated print agent 166 then proceeds to box 323 in which a loop is designated to process and print the email message and the one or more attachments. In this respect, the email message and the attachments are separated into separate "documents" for printing. In this regard, a document is defined as either the email itself or as one of the attachments that is to be printed separately on the respective printer 136 or 143. In designating a loop to process each one of these documents in box 323, the first document, usually the email message, is designated for processing.

Thereafter, in box 326 a print job is created for the current document that has been identified for processing. The printer 136 or 143 that is to be employed to print the document is associated with the print job. Also any requested print options that are included in the email message are also associated with the print job in order to affect proper rendering of the document. Specifically, the particular printer should be provided to the rendering application 169 (FIG. 1) in order to render the document in the format that is compatible with a particular printer 136, 143. Also if there are any print options that have been specified by the user of the mobile device 153 that are to be adhered to in rendering the document, such information needs to be included in the print job accordingly.

With reference to FIG. 3B, the automated print agent 166 then proceeds to box 329 in which a rendering application 169 is identified to render the print job in a printer ready format. In order to make this determination, the automated print agent 166 may include a rendering lookup table that provides the ability to determine the name and location of a specific rendering application 169 in the case that several different rendering applications 169 exist from which to choose. Alternatively, a single rendering application 169 may be employed. When the proper rendering application 169 is identified, then in box 333 the print job is applied to the appropriate rendering application 169 to be rendered in the printer ready format. Such a printer ready format may include, for example, printer control language (PCL) or PostScript. Note there may be other printer formats that are rendered by a particular rendering application 169 as can be appreciated by one with ordinary skill in the art.

In box 336, the automated print agent waits for the return of the rendered print job from the rendering application 169. Thereafter, in box 339 it is determined whether there were any printing errors that occurred during the rendering operation. Such may be the case, for example, if the rendering application was incapable of fulfilling all of the requested print options or if the rendering application 169 was unable to perform the rendering function at all. If there is an error in box 339, then the automated print agent 166 proceeds to box 343 in which an email message is generated that details the error related to the current print job and transmits the email message to the sender. Note that the destination of the error email is easily determined by obtaining the "from" address off of the email message that was received from the user of the mobile device 153.

On the other hand, assuming there is no error detected in box 339, then the automated print agent 166 proceeds to box 346 in which an email message is generated that informs the user of the mobile device 153 that the current print job was printed successfully. Note that this notification is not entirely necessary and it is possible to skip this task. This email message is transmitted to the user of the mobile device 153 in a similar manner as the error email is transmitted in box 343. After box 346, the automated print agent 166 proceeds to box 349 in which the current print job is queued up for printing in the associated printer identified in box 319 (FIG. 3A). Alternatively, in the case that a printing queue is not employed, then the print job may be applied directly to the printer itself.

With reference back to box 343, once the error email is transmitted to the user of a mobile device 153 then the automated print agent 166 proceeds to box 346. In box 346 it is determined whether the particular error detected in box 339 involves a complete failure to render the document thereby resulting in a failure to print the particular document. If such is the case then the automated print agent 166 proceeds to box 353. Otherwise, the automated print agent 166 moves to box 349. If the automated print agent 166 proceeds from box 346 to box 349, then generally the print error is assumed to be minor such that the document was rendered by the rendering application 169 using default parameters. These default parameters may differ from the print options specified by the user and associated with the print job in box 326. Thus, the ultimate printing of a document may be in a format that differs from that desired by the user. However, the user may determine what action is to be taken upon reception of the email informing the user of the fact that a print error occurred at the mobile device 153. Also, the user can also determine what action to take upon viewing the document as it was printed by the respective printer 136 or 143.

Once the print job has been queued up for printing or otherwise applied to a printer 136 or 143, or assuming that a print failure has been detected in box 346, the automated print agent 166 proceeds to box 353. In box 353 it is determined whether the last document has been processed in the current loop designated in box 323. If not then the automated print agent 166 moves to box 356 in which the next document is designated for processing. Thereafter, the automated print agent 166 reverts to box 326 to repeat the process for the next document. Otherwise, the automated print agent 166 then reverts back to box 303 to await the receipt of the next email message with attachments to be printed.

Figure 4A:
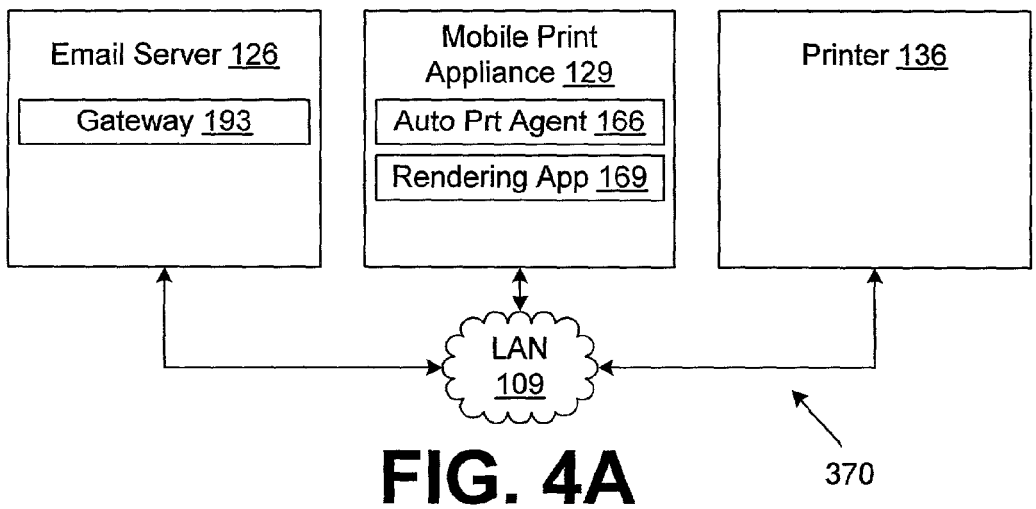
FIGS. 4A–F depict drawings of various mobile print configurations according to aspects of the present invention.

With reference next to FIGS. 4A–4E, shown are several different mobile print configurations that illustrate the various devices in which the auto print agent 166 and the rendering application 169 may be located to provide various examples of the implementation of the mobile print network 100 (FIG. 1) according to the present invention. With reference specifically to FIG. 4A, shown is a first mobile print configuration 370 that includes the email server 126, the mobile print appliance 129, and the printer 136, all of which are coupled to the local area network 109 as described with reference to FIG. 1. The auto print agent 166 and the rendering application 169 are located on the mobile print appliance 129. In this respect, the mobile print appliance 129 is easily fit within the local area network 109 without disrupting or changing any existing devices coupled to the local area network 109. Specifically, the email server 126 that includes the gateway 193 and the printer 136 remain unchanged.

Figure 4B:
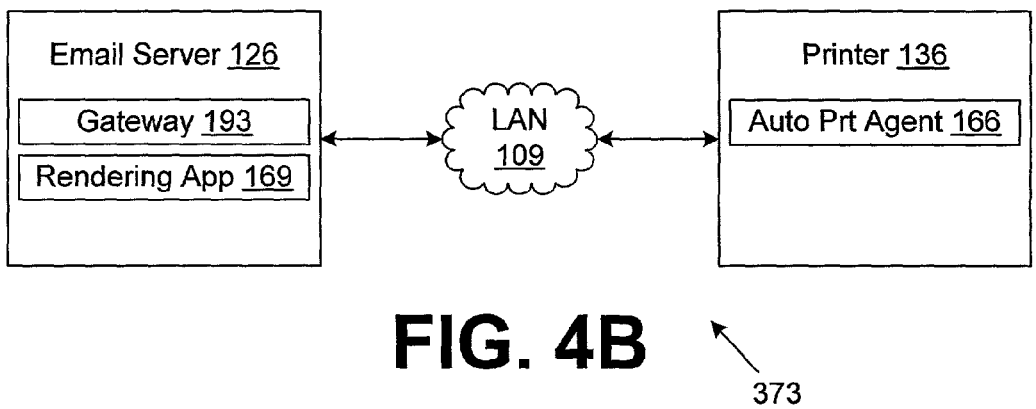

Referring to FIG. 4B, shown is a second mobile print configuration 373 in which the rendering application 169 is located on the email server 126 and the auto print agent 166 is located on the printer 136. Such may be the case when the printer 136 has the processing power to execute the auto print agent 166 in addition to its usual printing operation. In sending a print job to the rendering application 169, the auto print agent 166 employs the protocol used by the local area network 109. Note however that the second mobile print configuration 373 does include a downside. In particular, the rendering application 169 may bog down the operation of the email server 126 that might inhibit the speed of operation of the gateway 193 in distributing email messages to other devices on the local area network 109. However, the second mobile print configuration 373 includes the advantage that no additional devices need to be coupled to the local area network 109. This may be beneficial where there is little room for expansion on a specific local area network 109.

Figure 4C:
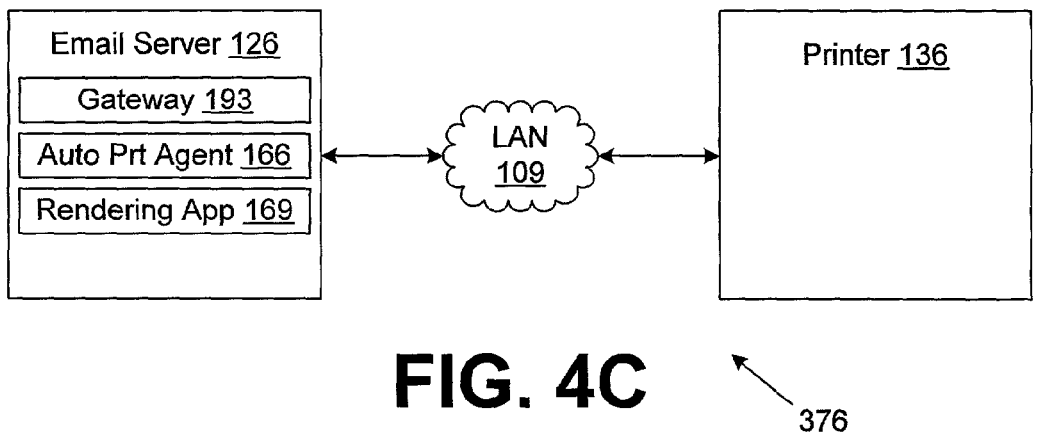

With reference to FIG. 4C, shown is a third mobile print configuration 376 in which the auto print agent 166 and the rendering application 169 are both located on the email server 126. The third mobile print configuration 376 includes the same benefit of the second mobile print configuration 373 (FIG. 4B) in that no new devices are coupled to the local area network 109 as is the case with the first mobile print configuration 370 (FIG. 4A). However, due to the fact that the auto print agent 166 and the rendering application 169 both reside on the email server 126, it is possible that the speed of operation of the gateway 193 will be significantly affected. This is because the additional processing requirements of the auto print agent 166 and the rendering application 169 will consume processing power that normally would have been devoted to the gateway 193.

Figure 4D:
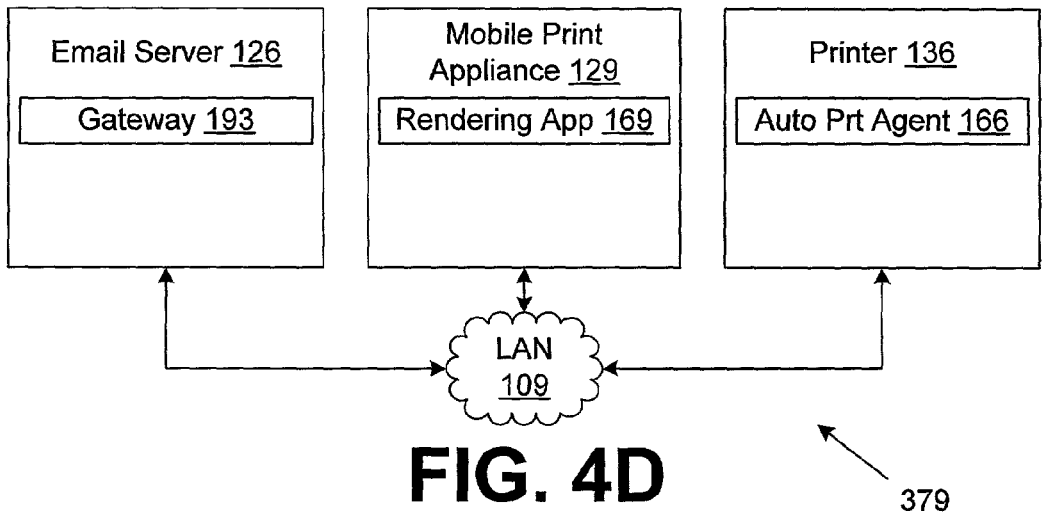

With respect to FIG. 4D, shown is a fourth mobile print configuration 379 that employs the email server 126, the mobile print appliance 129, and the printer 136, all of which are coupled to the local area network 109 as described with FIG. 1. Note however, that the rendering application 169 is stored and executed in the mobile print appliance 129 and the auto print agent 166 is stored and executed in the printer 136. This assumes that the printer 136 includes the extra processing capacity to store and execute the auto print agent 166.

Figure 4E:
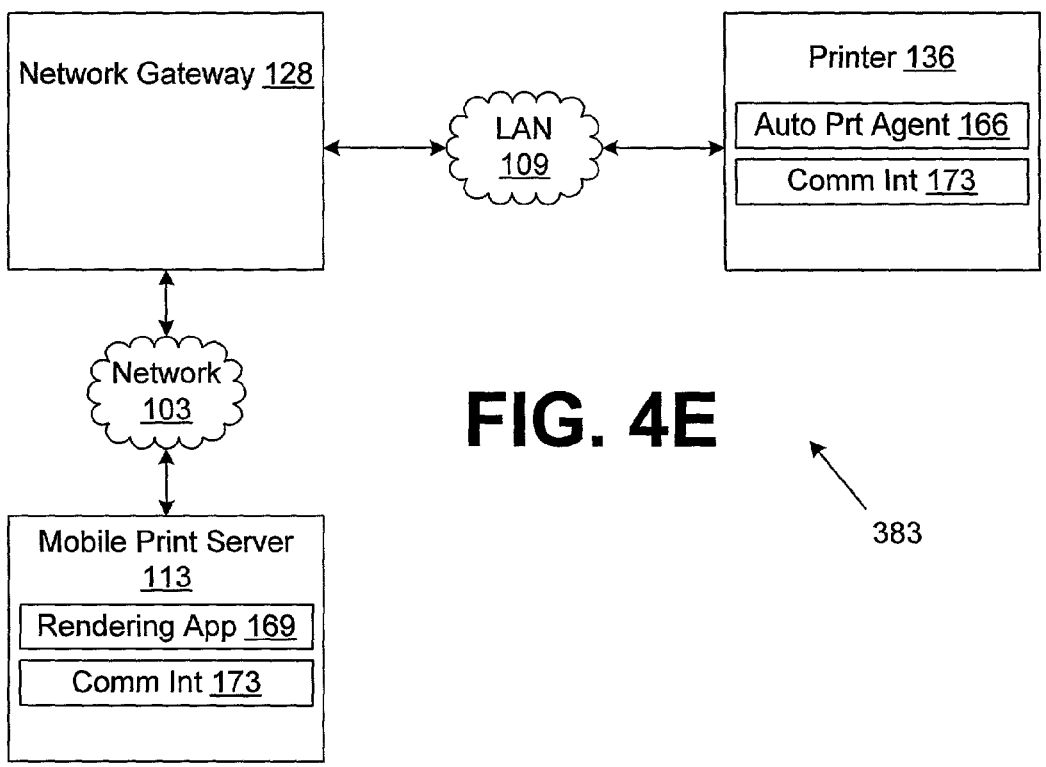

With reference to FIG. 4E, shown is a fifth mobile print configuration 383 in which the auto print agent 166 resides on the printer 136 and the rendering application 166 resides on the mobile print server 113. In this respect, the auto print agent 166 requests the rendering of a particular document from the rendering application 169 by transmitting a rendering request to the mobile print server 113. In order to facilitate communication between the printer 136 and the mobile print server 113, the communications interface 173 is provided in both the mobile print server 113 and the printer 136. In this respect, the communications interface 173 may entail the use of various protocols including, for example, the simple object access protocol (SOAP) 1.1 that is promulgated by the W3C organization as is generally known by those with ordinary skill in the art. In this manner, SOAP may be employed in combination with the hypertext transfer protocol (HTTP) as is generally known by those with ordinary skill in the art. Note that the fifth mobile print configuration 383 assumes that the printer 136 includes the processing capacity to store and execute the auto print agent 166 and the communications interface 173. The fifth mobile print configuration 383 provides an advantage in that it does not require a separate mobile print appliance 129 to be attached to the local area network 109 and it will not slow down or otherwise inhibit the operation of the email server 126.

Figure 4F:
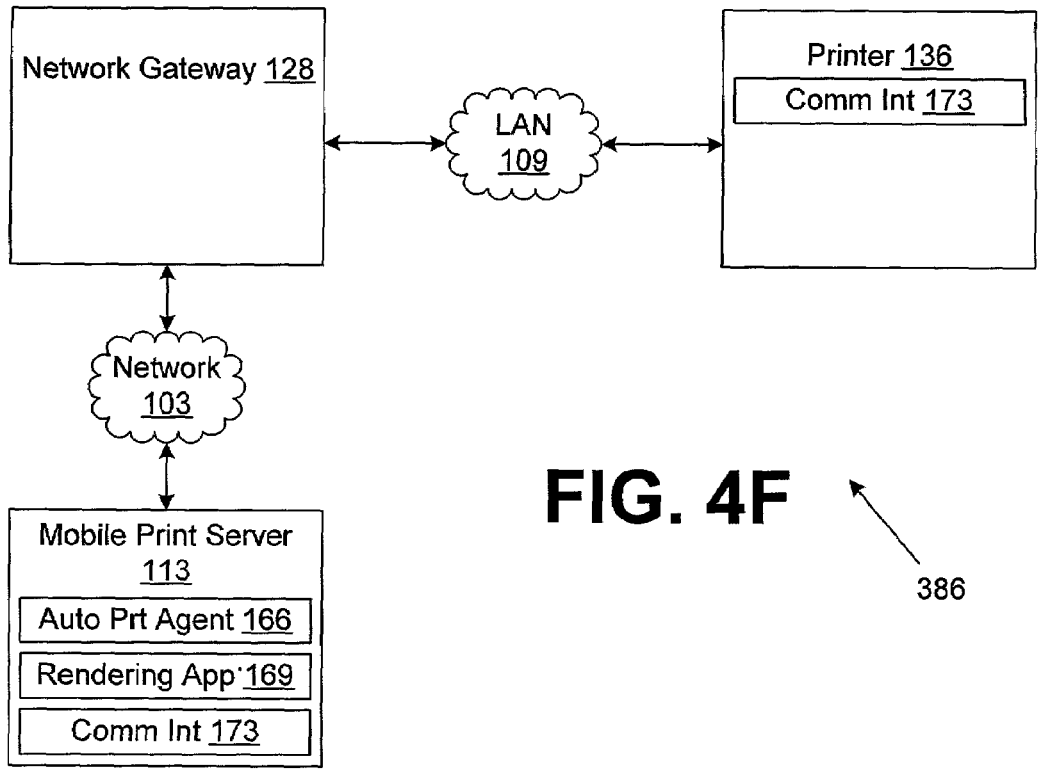

With reference to FIG. 4F, shown is a sixth mobile print configuration 386 according to another aspect of the present invention. In the sixth mobile print configuration 386, the auto print agent 166 and the rendering application 169 are located in the mobile print server 113 according to an aspect of the present invention. In this respect, when the printer alias 199a is employed as the destination address of an email message with an attachment to be printed, the email message is directed to the auto print agent 166 on the mobile print server 113 through the network 103. The auto print agent 166 performs its tasks on the mobile print server 113 and interfaces with the rendering application 169 as needed to render the document into the printer ready format. The documents to be printed are then transmitted to the printer 136 using the communications interface 173 that was described with respect to the fifth mobile print configuration 383 (FIG. 4E). This particular configuration provides significant advantages in that only the communications interface 173 need be included in the printer 136 in order that it can receive the document from the mobile print server 113.

Figure 5:
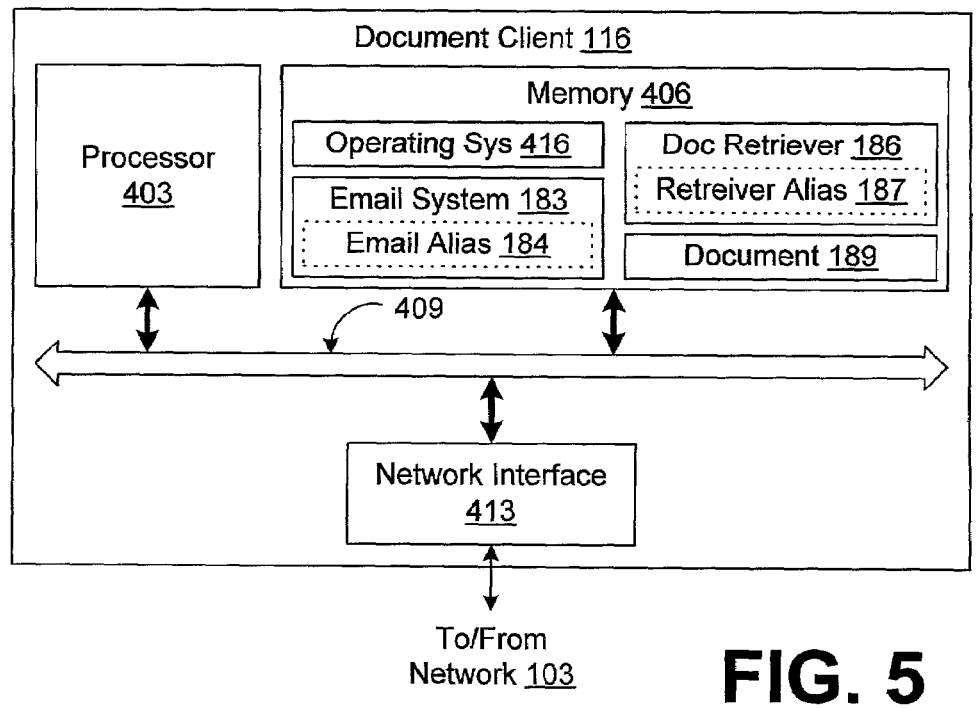
FIG. 5 depicts a block diagram of a document client in the mobile print network of FIG. 1 that includes a document retriever according to another aspect of the present invention.

Referring next to FIG. 5, shown is the document client 116 according to another aspect of the present invention. As shown, the document client 116 includes a processor circuit with a processor 403 and a memory 406, both of which are coupled to a local interface 409. The local interface 409 may be, for example, a data bus with an accompanying control/address bus as is generally known by those with ordinary skill in the art. The document client 116 also includes a network interface 413 that links the local interface 409 to the network 103. In this respect, the network interface 413 may comprise, for example, an appropriate modem or interface card as is generally known by those with ordinary skill in the art. In addition, stored on the memory 406 and executable by the processor 403 are an operating system 416, the email system 183, the document retriever 186, and the document 189.

The document client 116 may include one or more peripheral devices such as, for example, a keypad, touch pad, touch screen, microphone, scanner, mouse, joystick, or one or more push buttons, etc. The peripheral devices may also include display devices, indicator lights, speakers, printers, etc. Specific display devices may be, for example, cathode ray tubes (CRT), liquid crystal display screens, gas plasma-based flat panel displays, or other types of display devices, etc.

The memory 406 may include both volatile and nonvolatile memory components. Volatile components are those that do not retain data values upon loss of power. Nonvolatile components are those that retain data upon a loss of power. Thus, the memory 406 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other such of memory device.

In addition, the processor 403 may represent multiple processors and the memory 406 may represent multiple memories that operate in parallel. In such a case, the local interface 409 may be an appropriate network that facilitates communication between any two of the multiple processors, between any processor and any one of the memories, or between any two of the memories etc. The processor 403 may be electrical or optical in nature.

The operating system 416 is executed to control the allocation and usage of hardware resources in the document client 116. Specifically, the operating system 416 controls the allocation and usage of the memory 406, processing time, and the peripheral devices as well as performing other functionality. In this manner, the operating system 416 serves as the foundation on which applications depend as is generally known by those with ordinary skill in the art.

The document retriever 186 is implemented to provide a document 189 to the user in response to a request email message that was sent from a remote device such as, for example, the mobile device 153 (FIG. 1) or other device coupled either directly or indirectly with the network 103.

Figure 6A:
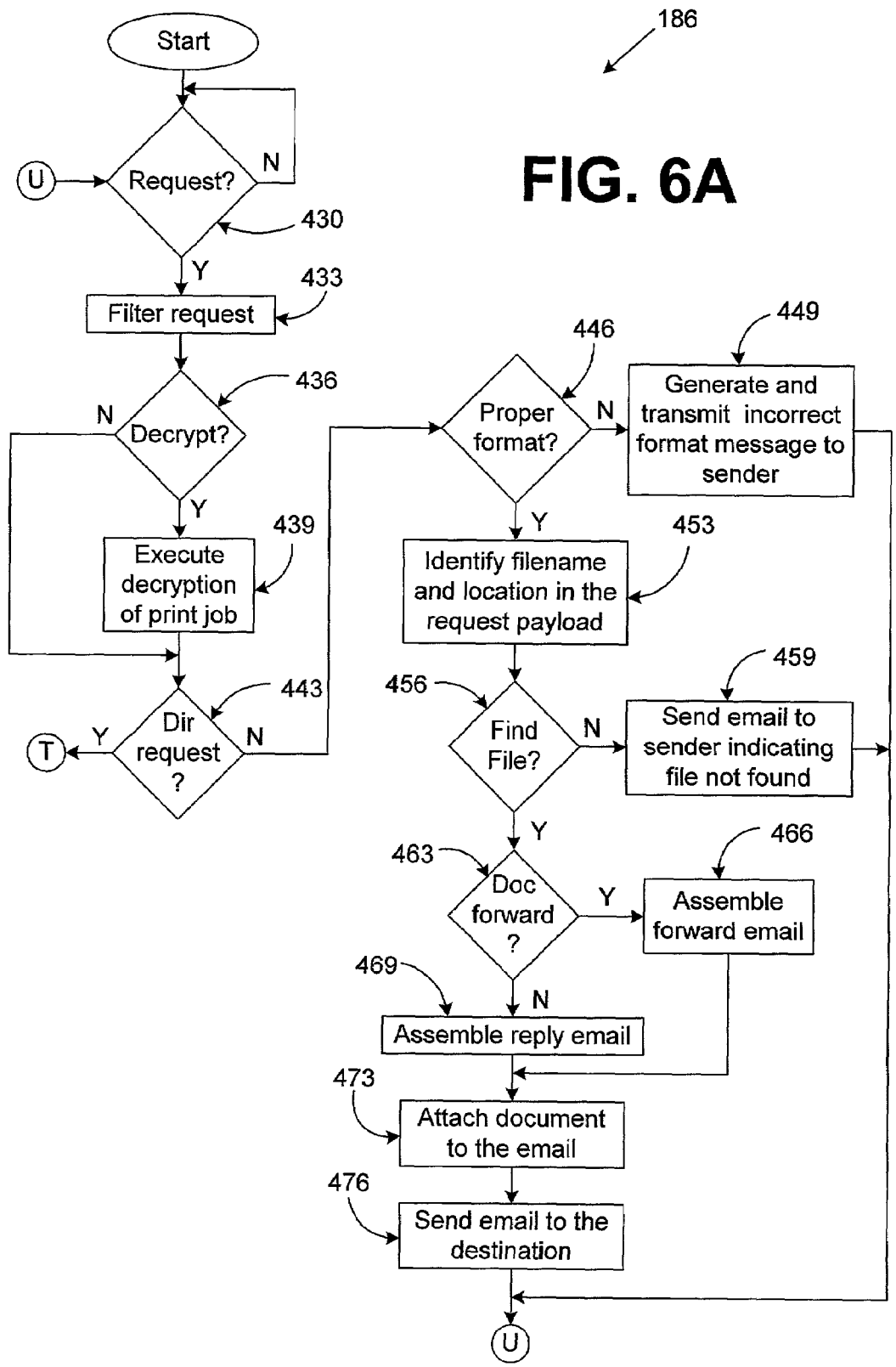
FIGS. 6A and 6B depict a flow chart of the document retriever of FIG. 6.

Turning then to FIG. 6A, shown is a flow chart of the operation of the document retriever 186 according to an aspect of the present invention. Alternatively, the flow chart of FIG. 6A may be viewed as depicting steps in a method implemented in the document client 116 (FIG. 5). The document retriever 186 is executed by the document client 116 to supply the document 189 (FIG. 5) to a remote device in response to a request email message as was previously described. Beginning with box 430, the document retriever 186 waits until it receives a request email message from a requesting device. Note that the request email message may be received by the email system 183 if addressed to the email alias 184 (FIG. 5) or it may be received directly by the document retriever 186 if addressed to the retriever alias 187. In any case, assuming that the document retriever 186 receives the request email message that embodies the document request for the document 189, the document retriever 186 proceeds to box 433. In box 433, the request is filtered in a similar manner to the filtering that is executed in box 306 (FIG. 3A) relative to the automated print agent 166.

Thereafter, the document retriever 186 proceeds to box 436 in which it is determined whether the request email message is to be decrypted. If so, then the document retriever 186 proceeds to box 439 in which the appropriate decryption system is executed to decrypt the request email message accordingly. However, if no decryption is required in box 436, then the document retriever 186 proceeds to box 443. In box 443, the document retriever 186 determines whether the request email message is a request for a directory file listing of the one or more documents 189 stored on the memory 406. If the request email message is such a request in box 443, then the document retriever 186 moves to connector T as shown. Otherwise, the document retriever 186 assumes that the request email message is an actual request for the document 189 and the document retriever 186 proceeds to box 446.

In box 446, the request email message is scrutinized to determine whether it is in the proper format such that the document retriever 186 recognizes the requested document, the directory location of that document in the document client 116, and any other information pertinent to the retrieval of the document 189. If the request email message is not in a proper format, then the document retriever 186 proceeds to box 449 in which an incorrect format message is generated and transmitted to the original sender of the request email message. The incorrect format message may actually be a reply email message that is automatically sent back to the originator of the request email message as is generally understood by those with ordinary skill in the art. Thereafter, the document retriever reverts back to box 430 to await the receipt of the next request email message.

Assuming however that the request email message is properly formatted in box 446, then the document retriever 186 proceeds to box 453 in which the request email message is parsed by the document retriever 186 to identify the file name and location of the document 189 to be retrieved in the request pay load of the request email message. Thereafter, in box 456, the document retriever 186 attempts to find the file that corresponds to the document 189 in the memory 406 (FIG. 5) of the document client 116.

If the proper file can not be found in the memory 406, then the document retriever 186 proceeds to box 459 in which a reply email message is generated and transmitted to the sender of the request email message that indicates that the file can not be found. Thereafter, the document retriever 186 reverts back to box 430 in order to await the receipt of the next request email message.

However, assuming that the proper file is found in the memory 406, then the document retriever 186 proceeds to box 463 in which it is determined whether the document is to be forwarded to a third party address separate from the address of the sender. If the document is to be forwarded, then the document retriever 186 moves to box 466. Otherwise, the document retriever 186 proceeds to box 469. In box 466, a forwarded email message is generated in the memory 406 for transport to the ultimate destination address that was specified in the request email message. The document retriever 186 determines that a forwarding email is to be created, as opposed to a reply email, by identifying whether a forwarding email address is indicated in the request email message from the original sender. After the forward email message is generated in box 466, the document retriever 186 proceeds to box 473.

Assuming, that the document retriever 186 proceeds to box 469, then a reply email message is generated in the memory 406 for transmission to the sender. Thereafter, in box 473 the requested document 189 stored in the memory 406 is attached to the reply email message to the sender. Then, the document retriever 186 proceeds to box 476 in which either the forward or reply email message is sent to the ultimate network destination in the form of an email transmission. Thereafter, the document retriever 186 reverts back to box 430 to await the receipt of another request email message.

Figure 6B:
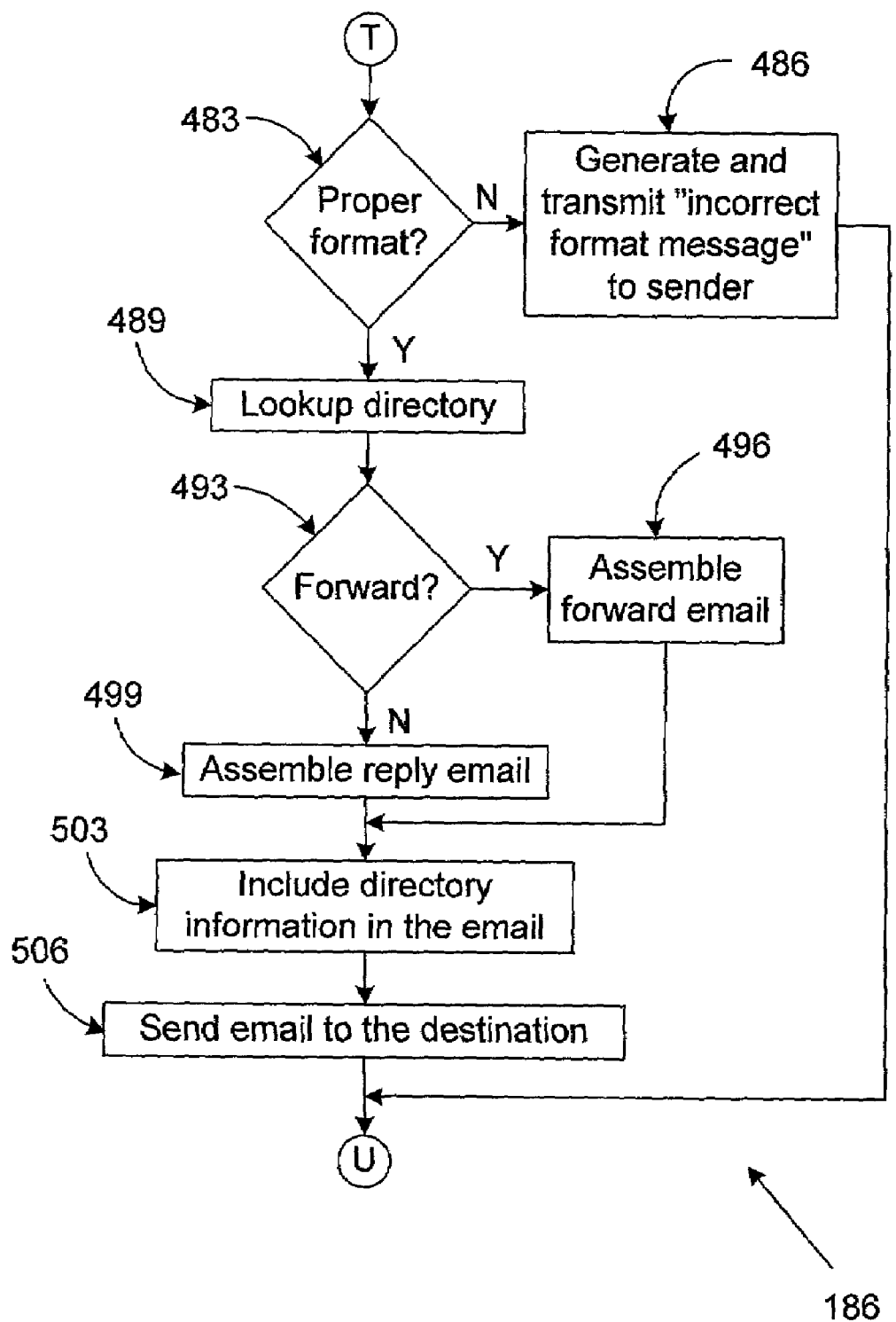

Referring next to FIG. 6B, shown is a flow chart that shows the continuation of the document retriever 186 or method from FIG. 6A. Assuming that the request email message received from the sending device is a request for a directory file listing in box 443, then the document retriever 186 proceeds to box 483 in which it is determined whether the directory request email message is properly formatted according to the standards employed by the document retriever 186. If not, then the document retriever 186 proceeds to box 486 in which an incorrect format message is generated and transmitted via email to the sending device. Thereafter, the document retriever reverts back to box 430 (FIG. 6A) to await the arrival of the next request email message. Assuming however that the directory request email message is in the proper format in box 483, then the document retriever 186 proceeds to box 489 in which the directory file listing of the document client 116 is looked up to be provided to the requester.

Note that this lookup function may be restricted to specific directories in the document client 116 or it may entail all of the directories of the document client 116 in the memory 406. After the directory information is obtained in box 489, the document retriever 186 proceeds to box 493 in which it is determined whether the directory file listing is to be forwarded to a third party address or to be transmitted back to the sender in the form of a reply email. The reply email approach is used, for example, when a user wishes to view the directory on the device such as the mobile device 153 (FIG. 1) from which they sent the request. However, the user may wish to have the directory printed out on the printer 136 or 143 so they can view the directory in paper hard copy. The determination as to whether or not the directory is to be forwarded to a third party address or to be sent in a reply email back to the sender is made by examining the directory request to identify whether a forwarding address is indicated therein. If a forwarding address is not present, then the "from" address of the directory email is employed to send the directory information in a reply email.

Thus, in box 493, assuming that the directory file listing is to be forwarded to a third party address then the document retriever 186 proceeds to box 496 in which the forward email is assembled in the memory 406. On the other hand, if the directory file listing is to be sent to the original sender by way of a reply, then the document retriever 186 proceeds to box 499 in which the reply email is assembled and stored in the memory 406. From boxes 496 and 499, the document retriever 186 proceeds to box 503 in which the directory file listing is included in the newly created email message in the memory 406. Then, in box 506, the directory response email message is transmitted to the network destination indicated by the address associated therewith. Thereafter, the document retriever 186 then reverts back to box 430 to await the receipt of the next request email message.

Although the automated print agent 166 and the document retriever 186 of the present invention are embodied in software or code executed by general purpose hardware as discussed above, as an alternative the automated print agent 166 and the document retriever 186 may also be embodied in dedicated hardware or a combination of software/general purpose hardware and dedicated hardware. If embodied in dedicated hardware, the automated print agent 166 and the document retriever 186 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 3A, 3B, 6A, and 6B show the architecture, functionality, and operation of an implementation of the automated print agent 166 and the document retriever 186. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 3A, 3B, 6A, and 6B show a specific order of execution, it is understood that the order of execution may differ from that which is depicted. For example, the order of execution of two or more blocks may be scrambled relative to the order shown. Also, two or more blocks shown in succession in FIG. 3A, 3B, 6A, or 6B may be executed concurrently or with partial concurrence. In addition, any number of counters, state variables, warning semaphores, or messages might be added to the logical flow described herein, for purposes of enhanced usability, accounting, performance measurement, or providing troubleshooting aids, etc. It is understood that all such variations are within the scope of the present invention. Also, the flow charts of FIGS. 3A, 3B, 6A, and 6B are relatively self-explanatory and are understood by those with ordinary skill in the art to the extent that software and/or hardware can be created by one with ordinary skill in the art to carry out the various logical functions as described herein.

Also, where the automated print agent 166 and the document retriever 186 comprise software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the automated print agent 166 and the document retriever 186 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. A printing system, comprising:
   an automated print agent located in a device coupled to a network; and
   a network alias associated with a printer coupled to the network, the automated print agent acting as a network destination for a transmitted document addressed to the network alias, the automated print agent orchestrating a printing of the transmitted document on the printer upon receipt of the transmitted document from a transmitting device.

2. The printing system of claim 1, further comprising a rendering application in the device that renders the transmitted document into a printer ready format upon an application of the transmitted document thereto by the automated print agent.

3. The printing system of claim 1, further comprising a rendering application in a second device that renders the transmitted document into a printer ready format upon an application of the transmitted document thereto by the automated print agent.

4. The printing system of claim 3, wherein the device is the printer.

5. The printing system of claim 1, wherein the network alias is an email address and the network destination is an email network destination.

6. The printing system of claim 5, further comprising an email server coupled to the network, the email server including a gateway that directs the transmitted document addressed to the network alias to the automated print agent.

7. The printing system of claim 2, wherein the device is an email server, the email server including a gateway that directs the transmitted document addressed to the network alias to the automated print agent, wherein the network alias is an email address and the network destination is an email network destination.

8. The printing system of claim 3, wherein the second device is an email server coupled to the network, the email server including a gateway that directs the transmitted document addressed to the network alias to the automated print agent, wherein the network alias is an email address and the automated print agent acts as an email network destination.

9. A printing method, comprising:
associating a network alias with a printer coupled to a network;
designating an automated print agent in a device coupled to a network as a network destination for a transmitted document addressed to the network alias; and
orchestrating a printing of the transmitted document on the printer with the automated print agent upon receipt of the transmitted document by the automated print agent that is addressed to the network alias.

10. The printing method of claim 9, further comprising rendering the transmitted document into a printer ready format in the device.

11. The printing method of claim 9, further comprising rendering the transmitted document into a printer ready format in a second device.

12. The printing method of claim 11, further comprising locating the automated print agent in the printer, wherein the device is the printer.

13. The printing method of claim 9, wherein the step of associating the network alias with the printer coupled to the network further comprises associating an email address with the printer.

14. The printing method of claim 13, further comprising:
providing en email server coupled to the network; and
directing the transmitted document addressed to the network alias to the automated print agent with a gateway.

15. The printing method of claim 10, further comprising:
employing an email server as the device; and
directing the transmitted document addressed to the network alias to the automated print agent with a gateway, wherein the network alias is an email address and the network destination is an email network destination.

16. The printing method of claim 11, further comprising:
employing an email server as the second device; and
directing the transmitted document addressed to the network alias to the automated print agent with a gateway, wherein the network alias is an email address and the automated print agent acts as an email network destination.

17. A printing system, comprising:
first means for printing coupled to a network and having a network alias associated therewith; and
second means for orchestrating a printing of a transmitted document on the first means upon receipt of the transmitted document thereby, wherein the transmitted document is addressed to the network alias and the second means is designated as the a network destination for the network alias.

18. The printing system of claim 17, further comprising third means for rendering the transmitted document coupled to the network, the third means rendering the transmitted document into a printer ready format.

19. The printing system of claim 17, further comprises fourth means for routing the transmitted document to the second means.

20. A system to facilitate email printing, comprising:
a processor circuit having a processor and a memory;
an automated print agent stored on the memory and executable by the processor, the automated print agent comprising:
logic that separates an email from at least one attachment associated therewith, the email being addressed with a destination address that is associated with a printer;
logic that converts at least one of the email and the at least one attachment into at least one document for printing: and
logic that applies the at least one document to the printer associated with the destination address of the email for printing.

21. The system of claim 20, wherein the logic that separates the email from the at least one attachment associated therewith, further comprises:
logic that separates the email from the at least one attachment;
logic that designates the email as a separate one of the documents; and
logic that designates the at least one attachments as a separate one of the documents.

22. The system of claim 20, wherein the logic that applies the at least one document to the printer associated with the destination address of the email for printing, further comprises:
logic that determines a printer type of the printer by drawing an association between the destination address and the printer;
logic that creates at least one print job for the at least one document and that associates the printer type with the at least one print job;
logic that applies the at least one print job to a rendering application to be rendered in a format compatible with the printer; and
logic that applies a rendered version of the at least one print job to the printer for printing.

23. The system of claim 20, wherein the logic that applies the rendered version of the at least one print job to the printer for printing further comprises logic that queues up the at least one print job for printing to the printer.

24. The system of claim 20, wherein the automated print agent further comprises logic that generates and transmits a print success message to a sender of the email upon completion of the printing of the at least one document on the printer.

25. The system of claim 20, wherein the automated print agent further comprises logic that generates and transmits an error message to a sender of the email upon an occurrence of a printing error.

26. The system of claim 25, wherein the logic that generates and transmits the error message to the sender of the email upon the occurrence of the printing error further comprises logic that generates and transmits a print failure message to the sender of the email upon the failure of the at least one document to print on the printer.

27. A program stored on a computer readable medium to facilitate email printing, comprising:
code that separates an email from at least one attachment associated therewith, the email being addressed with a destination address that is associated with a printer;
code that converts at least one of the email and the at least one attachment into at least one document for printing; and
code that applies the at least one document to the printer associated with the destination address of the email for printing.

28. The program stored on a computer readable medium of claim 27, wherein the code that separates the email from the at least one attachment associated therewith, further comprises:
code that separates the email from the at least one attachment;
code that designates the email as a separate one of the documents; and
code that designates the at least one attachments as a separate one of the documents.

29. The program stored on a computer readable medium of claim 27, wherein the code that applies the at least one document to the printer associated with the destination address of the email for printing, further comprises:
code that determines a printer type of the printer by drawing an association between the destination address and the printer;
code that creates at least one print job for the at least one document and that associates the printer type with the at least one print job;
code that applies the at least one print job to a rendering application to be rendered in a format compatible with the printer; and
code that applies a rendered version of the at least one print job to the printer for printing.

30. The program stored on a computer readable medium of claim 27, wherein the code that applies the rendered version of the at least one print job to the printer for printing further comprises code that queues up the at least one print job for printing to the printer.

31. The program stored on a computer readable medium of claim 29, further comprising code that generates and transmits a print success message to the sending device of the email upon completion of the printing of the at least one document on the printer.

32. The program stored on a computer readable medium of claim 27, further comprising code that generates and transmits an error message to the sending device upon an occurrence of a printing error.

33. The program stored on a computer readable medium of claim 32, wherein the code that generates and transmits the error message to the sender of the email upon the occurrence of the printing error further comprises code that generates and transmits a print failure message to the sending device upon the failure of the at least one document to print on the printer.

34. A method to facilitate email printing, comprising:
separating an email from at least one attachment associated therewith, the email being addressed with a destination address that is associated with a printer;
converting at least one of the email and the at least one attachment into at least one document for printing; and
applying the at least one document to the printer associated with the destination address of the email for printing.

35. The method of claim 34, wherein the step of separating the email from the at least one attachment associated therewith, further comprises:
separating the email from the at least one attachment;
designating the email as a separate one of the documents; and
designating the at least one attachments as a separate one of the documents.

36. The method of claim 34, wherein the step of applying the at least one document to the printer associated with the destination address of the email for printing, further comprises:
determining a printer type of the printer by drawing an association between the destination address and the printer;
creating at least one print job for the at least one document and that associates the printer type with the at least one print job;
applying the at least one print job to a rendering application to be rendered in a format compatible with the printer; and
applying a rendered version of the at least one print job to the printer for printing.

37. The method of claim 34, wherein the step of applying the rendered version of the at least one print job to the printer for printing further comprises queuing up the at least one print job for printing to the printer.

38. The method of claim 34, further comprising generating and transmitting a print success message to the sending device of the email upon completion of the printing of the at least one document on the printer.

39. The method of claim 34, further comprising generating and transmitting an error message to the sending device upon an occurrence of a printing error.

40. The method of claim 39, wherein the step of generating and transmitting the error message to the sender of the email upon the occurrence of the printing error further comprises generating and transmitting a print failure message to the sending device upon the failure of the at least one document to print on the printer.

41. A system to facilitate email printing, comprising:
means for separating an email from at least one attachment associated therewith, the email being addressed with a destination address that is associated with a printer;
means for converting at least one of the email and the at least one attachment into at least one document for printing; and
means for applying the at least one document to the printer associated with the destination address of the email for printing.

42. The system of claim 41, wherein the means for separating the email from the at least one attachment associated therewith, further comprises:
means for separating the email from the at least one attachment;
means for designating the email as a separate one of the documents; and means for designating the at least one attachments as a separate one of the documents.

43. The system of claim 41, wherein the means for applying the at least one document to the printer associated with the destination address of the email for printing, further comprises:
- means for determining a printer type of the printer by drawing an association between the destination address and the printer;
- means for creating at least one print job for the at least one document and that associates the printer type with the at least one print job;
- means for applying the at least one print job to a rendering application to be rendered in a format compatible with the printer, and
- means for applying a rendered version of the at least one print job to the printer for printing.

44. The system of claim 41, wherein the means for applying the rendered version of the at least one print job to the printer for printing further comprises means for queuing up the at least one print job for printing to the printer.

45. The system of claim 41, further comprising means for generating and transmitting a print success message to the sending device of the email upon completion of the printing of the at least one document on the printer.

46. The system of claim 41, further comprising means for generating and transmitting an error message to the sending device upon an occurrence of a printing error.

47. The system of claim 46, wherein the means for generating and transmitting the error message to the sender of the email upon the occurrence of the printing error further comprises means for generating and transmitting a print failure message to the sending device upon the failure of the at least one document to print on the printer.

* * * * *